(12) United States Patent
Henry

(10) Patent No.: US 7,548,169 B2
(45) Date of Patent: Jun. 16, 2009

(54) BIRTH MONITORING SYSTEM FOR PIGLETS

(75) Inventor: Marjolaine Henry, St. Lazare (CA)

(73) Assignee: Conception Ro-Main Inc., Quebec (CA)

( * ) Notice: Subject to any disclaimer, the term of this patent is extended or adjusted under 35 U.S.C. 154(b) by 0 days.

(21) Appl. No.: 11/401,454

(22) Filed: Apr. 11, 2006

(65) Prior Publication Data

US 2007/0262859 A1   Nov. 15, 2007

(30) Foreign Application Priority Data

Apr. 12, 2005 (CA) .................................... 2501894

(51) Int. Cl.
*G08B 23/00* (2006.01)
(52) U.S. Cl. ................. 340/573.3; 340/573.2; 119/502; 119/503
(58) Field of Classification Search ............. 340/573.3, 340/573.7, 573.1, 471–474, 572.1, 571, 573.2; 119/502–503, 505, 509, 506, 308
See application file for complete search history.

(56) References Cited

U.S. PATENT DOCUMENTS

| | | | | |
|---|---|---|---|---|
| 3,844,273 A | * | 10/1974 | Polson | ....................... 600/551 |
| 4,028,687 A | * | 6/1977 | Hamaguchi et al. | .... 340/870.16 |
| 4,264,900 A | | 4/1981 | Charlier | |
| 4,319,583 A | * | 3/1982 | Ingle | ........................... 600/588 |
| 4,651,677 A | * | 3/1987 | de Wit et al. | ................. 119/505 |
| 5,233,940 A | * | 8/1993 | Berglund | ..................... 119/505 |
| 5,729,590 A | * | 3/1998 | Dimitriadis et al. | ......... 340/7.22 |
| 5,734,128 A | * | 3/1998 | Gades et al. | ................. 177/244 |
| 5,921,205 A | * | 7/1999 | Nooyen et al. | .............. 119/505 |
| 6,069,655 A | * | 5/2000 | Seeley et al. | ................. 348/154 |
| 6,997,140 B2 | * | 2/2006 | Finlayson | .................... 119/858 |
| 7,178,484 B2 | * | 2/2007 | Kleinsasser | ................. 119/505 |

FOREIGN PATENT DOCUMENTS

EP           0 108 300           12/1986

OTHER PUBLICATIONS 2004-357747, Aug. 2003, Derwent, Lareau P.*

* cited by examiner

*Primary Examiner*—Benjamin C Lee
*Assistant Examiner*—Daniel Previl
(74) *Attorney, Agent, or Firm*—Adrian D. Battison; Ade & Company Inc.

(57) ABSTRACT

The number of piglets dying at birth is reduced by providing a motion or weight sensor in a farrowing crate at the piglet area thereof so that, when the sow is expected to give birth, the motion sensor is located in the crate at a location to detect motion of one or more piglets after birth and, on detection of motion of the one or more piglets, causing the motion sensor to wirelessly communicate a signal to a pager carried by an operator indicating to the operator that birth of piglets is in progress.

6 Claims, 1 Drawing Sheet

BIRTH MONITORING SYSTEM FOR PIGLETS

This invention relates to a method for raising piglets and particularly to a monitoring system which can communicate to an operator when birth is occurring to allow operator intervention to reduce piglet loss at birth.

BACKGROUND OF THE INVENTION

It is known in regard to the raising of animals, particularly cows and dogs, that a device be provided to detect the onset of the birthing process commonly by attaching the device to the vagina or vulva of the animal so that a signal can be generated and communicated to the operator. Examples are shown in European Application 108,330 (Weiland) published 16 May 1984, in U.S. Pat. No. 4,264,900 (Charlier) issued 28 Apr. 1981 and in U.S. Pat. No. 4,319,583 (Ingle) issued 16 Mar. 1981.

Also in U.S. Pat. No. 4,651,677 (de Wit) issued Mar. 24, 1987 is shown an arrangement in which a microphone detects sounds emitted by a sow and/or the piglets and analyzes the sounds to determine the condition of birthing or crushing of the piglets to summon the operator. This arrangement is apparently not currently available in the market place.

SUMMARY OF THE INVENTION

It is one object of the invention to provide a method for raising pigs by which birthing is detected in time to provide a signal to an operator to attend the birthing with the opportunity to reduce deaths of the piglets at birth.

According to one aspect of the invention there is provided a method for raising piglets comprising:

providing a farrowing crate having a sow containing area and at least one piglet area into which the piglets can move;

locating a pregnant sow in the sow containing area of the farrowing crate;

when the sow is expected to give birth, locating in the crate a sensor at a location to detect presence of one or more piglets in the piglet area after birth;

and, on detection of the presence of the one or more piglets, causing the sensor to wirelessly communicate a signal to an operator indicating to the operator that birth of piglets is in progress.

The sensor may be a motion sensor or may be a weight sensor where each is responsive to the presence of the piglet or piglets n the piglet area.

Preferably the motion sensor is located so as to detect motion in the at least one piglet area. It can however be located at other areas in the crate with the intention that the movement of the first born piglets be detected rather than any movement of the sow.

The number of sensors can be selected from one or more depending on the types and the areas to be sensed for piglets.

The sensors may be fixed in each of the crates or may be movable from one crate to another as the operator determines that a sow is ready to farrow. Suitable mountings for the sensors can be provided so that they can be suitable mounted or fixed in the crate wither in fixed or portable manner.

Preferably the motion sensor is located so as to detect motion in a corner of the at least one piglet area.

Preferably the motion sensor is located in the at least one piglet area.

Preferably the sensor is arranged so that the signal is communicated wirelessly to a device carried by the operator. However other types of communication may be used. The device may be a pager. However other types of communication system can be used including internet connections, mobile phones, and any other electronic communication. Alternatively simple indicator lights such as LEDs can be used in a corridor area or any other suitable location.

Preferably the crate is located in farrowing room which includes a series of such crates and wherein the signal contains information identifying the crate concerned.

Preferably the farrowing crate is located in a farrowing room which includes a series of such crates and wherein each crate contains a separate motion sensor.

Preferably at least some of the motion sensors are connected to a common central unit in the form of a circuit board or other central communication system arranged to generate and communicate the signal to the operator in response to a signal from one of the motion sensors connected thereto.

According to a second aspect of the invention there is provided an apparatus for use in raising piglets wherein a pregnant sow is located in a farrowing crate having a sow containing area and at least one piglet area into which the piglets can move, the apparatus comprising:

a sensor arranged to be at a location to detect presence of one or more piglets after birth within the at least one piglet area;

and a control system arranged for causing wireless communication of a signal to an operator indicating to the operator that birth of piglets is in progress.

BRIEF DESCRIPTION OF THE DRAWINGS

One embodiment of the invention will now be described in conjunction with the accompanying drawings in which.

DETAILED DESCRIPTION

Figure 1:
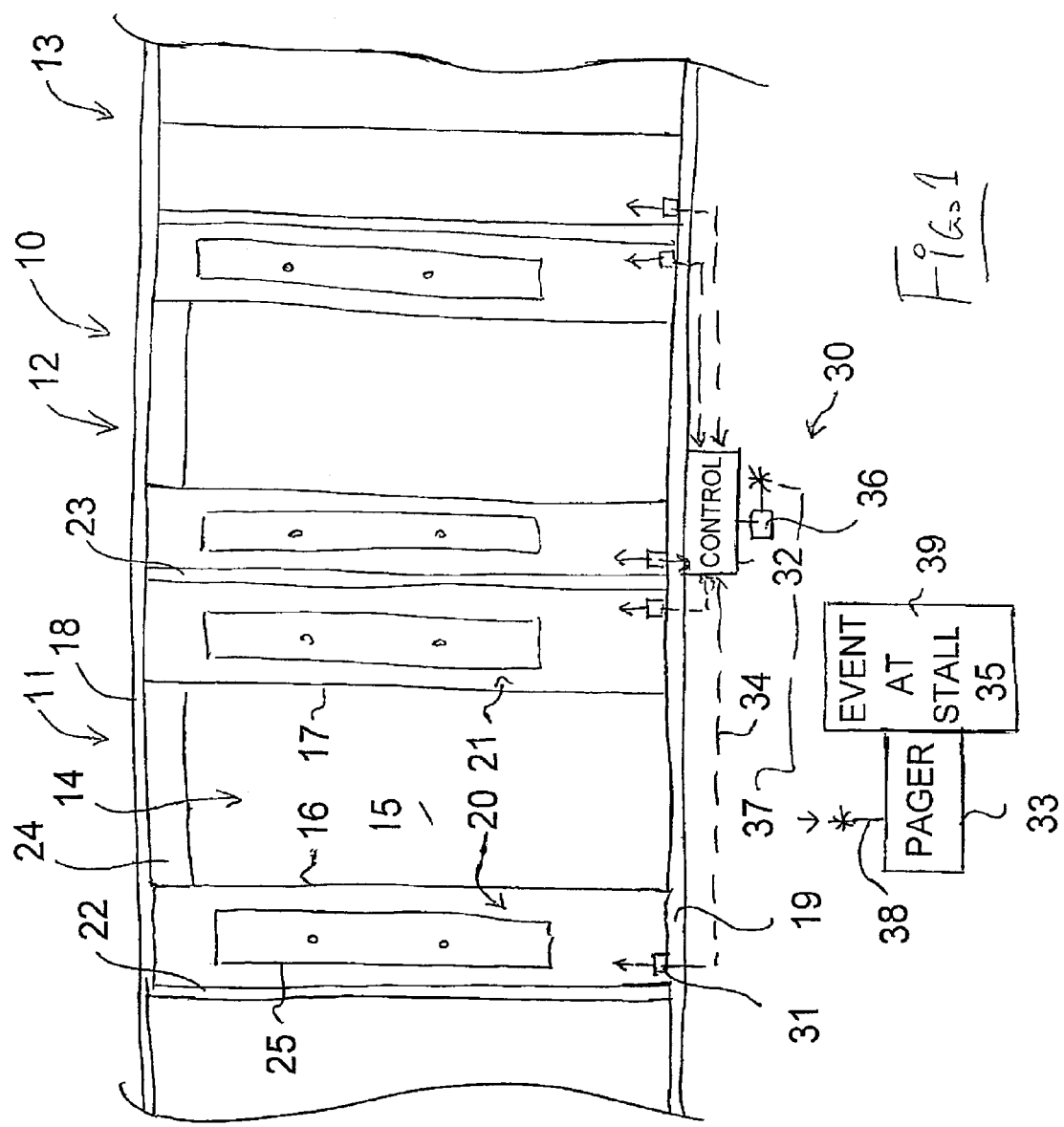
FIG. 1 is a schematic plan view of a series of farrowing crates including a monitoring system according to the present invention.

In FIG. 1 is shown a row of farrowing crates where the row is generally indicated at 10 and includes a series of farrowing crates indicated at 11, 12, 13 etc. Each farrowing crate is identical to the others so that one is shown particularly at 11 and includes a sow containing area 14 with a floor 15 on which the sow can stand and lie defined by side edges 16 and 17. The sow containing area extends forwardly to a front wall 18 and rearwardly to a rear wall 19. On each side of the sow containing area 14 is defined a piglet receiving area 20 and 21. In most cases there is provided a piglet receiving area on each side of the sow containing area so that the piglets can move to either side of the sow depending upon the direction to which the sow is lying.

The crate is closed at the sides by walls 22 and 23. All of the walls 18, 19, 22 and 23 can be formed from posts and rails and there may be provided a gate at the front and/or rear.

In many cases the sow area 15 includes a feeder 24 at the front wall 18 from which the sow can take feed. The piglet containing areas 20 and 21 include a heating system for applying heat to the areas to keep the piglets at the required temperature. In the embodiment shown the heating system is indicated at 25 and comprises an overhead lamp. In some cases the heating system comprises a pad on the floor of the piglet area or in other cases both the lamp and the pad may be used. It will be appreciated that the temperature of the barn must be controlled to maintain the sow at a suitable temperature and this is often too cold for the piglets so that they must be heated by a supplementary heat source. It is also desirable to keep the piglets away from the sow as much as possible so as to reduce the possibility of crushing when the sow stands and lies. Suitable anti-crushing methods are well known to persons skilled in the art and include anti-crush bars at the side edges 16 and 17 and other systems of a more complex nature. In the present invention, there is provided a separate monitoring system generally indicated at 30 which includes a motion sensor 31, a control unit 32 and a pager 33. The motion sensors 31 of the system are conventional motion sensors. Examples of such sensors are readily available from burglar detection systems or other similar type devices. Such a motion sensor may issue a beam and receives a signal from the beam in response to the presence of an object in front of the beam which is moving. Other types of motion sensors which do not issue a beam can be used. Each motion centre is located in a respective one of the piglet containing areas so as to be responsive to movement of piglets within that area. Each motion sensor is connected to the control unit by a respective wire 34 so as to provide to the control unit an indication of which sensor has been activated by motion within the respective piglet area. The control unit includes an antenna 36 which transmits a signal 37 to the antenna 38 of a pager 39. The control unit is arranged such that the signal 37 includes information identifying the particular stall involved. The pager includes a screen 39 which indicates to the operator of the hog facility that a motion event has occurred and indicates the stall at which the motion has taken place. The system can be installed relatively inexpensively at the crates of the farrowing area. Thus when each sow is pregnant and ready to give birth, the sow is moved from an initial containment area into a respective one of the crates for the birthing process.

Up till now it has been necessary for the operator to maintain a watch over the sows and to use skills obtained from experience to know approximately when the sow will give birth. Even despite such experienced operators, it is possible for the sow to give birth without any attention and this can lead to the loss of piglets either by crushing or by still births. It is well known that early intervention during the birthing process can reduce the number of losses by an average of one or two piglets per sow per gestation. Such average losses provide thus a significant loss of income. A typical sow facility of this type may contain one thousand sows and an operator is present at all times but is involved in many functions during the working day. In individual cases, early intervention may prevent the loss of the whole litter or a significant part of the litter, which would otherwise dramatically increase average or cumulative losses.

The present system therefore provides an indication to the operator as to the presence of a piglet at a crate so that the operator may immediately move to the crate concerned and intervene in any problems that are arising. Stillbirths can be reduced by reducing difficulties in the birthing process by assisting where necessary. Crushing can be reduced by ensuring that the piglets are moved to the required area. The heating system can be turned on only when the birthing is actually occurring so as to reduce cost and to ensure the heating system is available as soon as the piglets are expelled thus increasing their tendency to move away from the sow to the heated areas within the corners of the crate.

Even though the birthing process is detected by the movement of the first or one of the first piglets, rather than by detecting the actual ejection of the first piglet, it has been found that this indication can be effected simply and effectively and yet provides a signal to the operator allowing intervention at a sufficiently early stage to provide the reduction in losses which can otherwise occur.

In place of a motion sensor, a weight sensor which responds to changes of weight on the floor of the piglet area can be used. In both cases the sensor acts to detect the presence of a piglet as it enters the piglet area.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for raising piglets comprising:
providing a farrowing crate having a sow containing area and at least one piglet area into which the piglets can move;
locating a pregnant sow in the sow containing area of the farrowing crate;
and detecting the commencement of birth of the piglets by locating in the crate a sensor at a location to detect the presence of one or more piglets in the piglet area after the birth;
the sensor being located in the farrowing crate at a position to detect the presence of the piglets and not the presence of the sow;
and, on detection by the sensor of presence of the one or more piglets, communicating a signal to an operator indicating to the operator that birth of piglets is in progress in the farrowing crate.

2. A method for raising piglets comprising:
providing a farrowing crate having a sow containing area and at least one piglet area into which the piglets can move;
locating a pregnant sow in the sow containing area of the farrowing crate;
detecting the commencement of birth of the piglets by providing a motion sensor at a location to detect the motion of a piglet in the piglet area after the birth;
the motion sensor being located in the farrowing crate at a position to detect movement of the piglets and not movement of the sow;
and, on detection of motion of the piglet by the sensor, communicating a signal to an operator indicating to the operator that birth of piglets is in progress in the farrowing crate.

3. The method according to claim 2 wherein there is provided a plurality of farrowing crates in a farrowing room each having a sow containing area and at least one piglet area into which the piglets can move, wherein the method includes providing to the operator arranged to work within the farrowing room a portable signaling device to be carried with the operator and wherein the signal is a wireless signal to the portable signaling device and the signal contains signal information identifying the crate concerned.

4. A method for raising piglets comprising:
providing a farrowing crate having a sow containing area and at least one piglet area into which the piglets can move;
locating a pregnant sow in the sow containing area of the farrowing crate;
detecting the commencement of birth of the piglets by providing a weight sensor in the piglet area to detect the presence of a piglet in the piglet area after the birth;
the weight sensor being located in the farrowing crate at a position to detect weight applied by the piglets and not weight applied by the sow;

and, on detection of presence of the piglet, communicating a signal to an operator indicating to the operator that birth of piglets is in progress in the farrowing crate.

5. The method according to claim 4 wherein there is provided a plurality of farrowing crates in a farrowing room each having a sow containing area and at least one piglet area into which the piglets can move, wherein the method includes providing to the operator arranged to work within the farrowing room a portable signaling device to be carried with the operator and wherein the signal is a wireless signal to the portable signaling device and the signal contains signal information identifying the crate concerned.

6. A method for raising piglets comprising:

providing a plurality of farrowing crates in a farrowing room each having a sow containing area and at least one piglet area into which the piglets can move;

locating a pregnant sow in the sow containing area of at least some of the farrowing crates;

detecting the commencement of birth of the piglets in a farrowing crate by locating in the crate a sensor at a location to detect the presence of a piglet in the piglet area after the birth;

the sensor being located in the farrowing crate at a position to detect the presence of the piglets and not the presence of the sow;

providing to an operator arranged to work within the farrowing room a portable signaling device to be carried with the operator;

on detection of the presence of the one or more piglets, communicating a wireless signal to the to the operator indicating that birth of piglets is in progress in the farrowing crate;

and providing in the signal information identifying the crate concerned and causing the portable signaling device of the operator to indicate from the signal the crate to the operator.

* * * * *